(12) United States Patent
Wiggins et al.

(10) Patent No.: US 7,147,430 B2
(45) Date of Patent: Dec. 12, 2006

(54) PNEUMATIC VALVE CONTROL USING DOWNSTREAM PRESSURE FEEDBACK AND AN AIR TURBINE STARTER INCORPORATING THE SAME

(75) Inventors: Jimmy D. Wiggins, Chandler, AZ (US); Paul W. Banta, Phoenix, AZ (US); Edward E. Woodruff, Quenn Creek, AZ (US)

(73) Assignee: Honeywell International, Inc., Morristown, NJ (US)

( * ) Notice: Subject to any disclaimer, the term of this patent is extended or adjusted under 35 U.S.C. 154(b) by 76 days.

(21) Appl. No.: 10/866,587

(22) Filed: Jun. 10, 2004

(65) Prior Publication Data

US 2005/0276685 A1    Dec. 15, 2005

(51) Int. Cl.
  *F01B 27/00* (2006.01)
(52) U.S. Cl. ............... 415/19; 415/151; 137/492.5; 137/488
(58) Field of Classification Search ................ 415/151, 415/19; 137/492.5, 492, 488; 251/30.1
  See application file for complete search history.

(56) References Cited

U.S. PATENT DOCUMENTS

| | | | |
|---|---|---|---|
| 2,938,537 A * | 5/1960 | Silver et al. ................ | 137/489 |
| 3,123,094 A | 3/1964 | Toschkoff | |
| 3,653,409 A | 4/1972 | Brannon | |
| 3,776,266 A | 12/1973 | Bass et al. | |
| 3,785,398 A | 1/1974 | Lonnemo et al. | |
| 4,044,794 A | 8/1977 | Matthews | |
| 4,367,767 A | 1/1983 | Hurd | |
| 4,617,958 A * | 10/1986 | Seidel et al. ............. | 137/492.5 |
| 4,649,803 A | 3/1987 | Abel | |
| 4,850,390 A | 7/1989 | Francois | |
| 4,854,222 A | 8/1989 | Vick | |
| 4,951,549 A | 8/1990 | Olsen et al. | |
| 5,197,516 A | 3/1993 | Smietana | |
| 5,445,188 A | 8/1995 | Bourkel et al. | |
| 5,460,198 A | 10/1995 | Kortge | |
| 5,934,326 A | 8/1999 | Kawase | |
| 5,967,176 A * | 10/1999 | Blann et al. ............. | 137/489.5 |
| 5,992,450 A | 11/1999 | Parker et al. | |
| 6,039,070 A | 3/2000 | Zaehe | |
| 6,263,908 B1 | 7/2001 | Love et al. | |
| 6,684,898 B1 * | 2/2004 | Wiggins et al. ........... | 137/15.25 |
| 6,694,746 B1 * | 2/2004 | Reed et al. .................... | 60/787 |

* cited by examiner

Primary Examiner—Edward K. Look
Assistant Examiner—Nathan Wiehe
(74) Attorney, Agent, or Firm—Ingrassia Fisher & Lorenz (57) ABSTRACT

A starter air valve assembly includes a valve body, a flow control valve, a rate control servo mechanism, and a valve actuator. The valve body defines a flow passage having at least an inlet port and an outlet port. The valve is disposed at least partially within the flow passage and is moveable between an open position and a closed position. The rate control servo mechanism is adapted to receive pressurized fluid and is configured, upon receipt of the pressurized fluid, to supply a controlled flow of the pressurized fluid. The valve actuator is coupled to the valve and is in fluid communication with the rate control servo to thereby receive the controlled flow of the pressurized fluid. The valve actuator is configured, upon receipt of the controlled flow of the pressurized fluid, to move the valve between the closed position and the open position at a substantially controlled rate.

16 Claims, 4 Drawing Sheets

PNEUMATIC VALVE CONTROL USING DOWNSTREAM PRESSURE FEEDBACK AND AN AIR TURBINE STARTER INCORPORATING THE SAME

TECHNICAL FIELD

The present invention relates to pneumatically actuated valves and, more particularly, to a pneumatically actuated starter air valve that uses downstream pressure feedback to provide improved opening characteristics.

BACKGROUND

Many relatively large turbine engines, including turbofan jet engines, may use an air turbine starter (ATS) to initiate turbine engine rotation. The ATS may be mounted by the engine, much as a starter for an automobile is located by the automobile engine. The ATS may be coupled to a high pressure fluid source, such as compressed air, which impinges upon a turbine wheel in the ATS causing it to rotate at a relatively high rate of speed. The ATS includes an output shaft that is coupled to the turbine wheel and, perhaps via one or more gears, to the jet engine. The output shaft thus rotates with the turbine wheel. This rotation in turn causes the jet engine to begin rotating. The applicant for the present invention, Honeywell International, Inc., has for years successfully designed, developed, and manufactured ATSs.

The flow of compressed air to an ATS may be controlled by, for example, a valve. This valve, if included, is typically referred to as a starter air valve. When the starter air valve is open, compressed air may flow through the starter air valve, and into the ATS. Conversely, when the starter valve is closed, compressed air flow to the ATS may be prevented. An ATS starter air valve, in many instances, includes a pneumatic actuator to move the valve into its open position. The source of pneumatic power to the actuator may be pressurized air supplied from, for example, an auxiliary power unit (APU), bleed air from another engine compressor, or a ground cart. In some instances, the pressurized air supplied to the ATS and the starter air valve is non-regulated, and at a pressure magnitude greater than what may be needed for the ATS operation. Hence, some aircraft starter air valves may also be configured as a pressure regulating valve, to thereby regulate the pressure of the air flow to the ATS.

Many starter air valve pneumatic actuators, for both regulator and non-regulator types of valves, include pistons with either a dynamic seal or diaphragm. Many of these actuators also include a small, fixed-diameter rating orifice to help control the opening rate of the starter air valve, and the pressure rise rate downstream of the starter air valve. Although these present actuators generally operate safely and effectively, the actuators can suffer certain drawbacks. For example, the piston seal (or diaphragm) can wear and cause some leakage past the actuator piston. This leakage can potentially degrade the opening performance of the starter air valve. In some cases, if the leakage becomes great enough, the actuator may be unable to open the starter air valve.

Hence, there is a need for a pneumatic control for various valves, including starter air valves, that addresses the above-noted drawbacks. Namely, a pneumatic control that will compensate for piston seal or diaphragm leakage that may occur in the actuator and/or will continue to operate even for relatively large amounts of piston seal or diaphragm leakage. The present invention addresses one or more of these needs.

BRIEF SUMMARY

The present invention provides a pneumatic valve assembly including a control that uses downstream pressure feedback to provide improved valve opening characteristics as compared to presently known valve assemblies, and that compensates for certain types of leakage within the actuator.

In one embodiment, and by way of example only, a starter air valve assembly includes a valve body, a valve, a rate control servo mechanism, and a valve actuator. The valve body defines a flow passage having at least an inlet port and an outlet port. The valve is disposed at least partially within the flow passage and is moveable between an open position and a closed position. The rate control servo mechanism has at least a control fluid inlet port, a feedback pressure inlet port, and a control fluid outlet port. The control fluid inlet port is adapted to receive a flow of pressurized control fluid, and the feedback pressure inlet port is in fluid communication with the flow passage outlet port. The rate control servo mechanism is responsive to receipt of the flow of pressurized control fluid to supply a controlled flow of the pressurized fluid via the control fluid outlet port. The valve actuator is coupled to the valve and is in fluid communication with the rate control servo mechanism control fluid outlet port to thereby receive the controlled flow of the pressurized fluid. The valve actuator is configured, upon receipt of the controlled flow of the pressurized fluid, to move the valve between the closed position and the open position at a substantially controlled rate.

In another exemplary embodiment, rate control servo mechanism for controlling a rate of movement of a valve includes a housing, a diaphragm, a control air flow passage, a feedback flow passage, a rate control flow passage, a vent passage, and a rate control valve. The housing defines at least a first chamber and a second chamber. The diaphragm is disposed between the first and second chambers and fluidly isolates the first and second chambers from one another. The control air flow passage extends through the housing and has at least an inlet port and an outlet port. The control air flow passage inlet port is adapted to receive a flow of pressurized fluid, and the control air flow passage outlet port is adapted to fluidly couple to a valve actuator. The feedback flow passage is coupled to the housing and has at least an inlet port and an outlet port. The feedback flow passage inlet port is adapted to fluidly couple to a flow duct, and the feedback flow passage outlet port is in fluid communication with the second chamber. The rate control flow passage is coupled to the housing and has at least an inlet port and an outlet port. The rate control flow passage inlet port is fluidly coupled to the feedback flow passage outlet port, and the rate control flow passage outlet port is in fluid communication with the first chamber. The vent passage has an inlet port and an outlet port. The vent passage inlet port is fluidly coupled to the control air flow passage outlet port, and the vent passage outlet port is vented to atmosphere. The rate control valve is disposed within the housing and is coupled to the diaphragm. The rate control valve is movable between a closed position, in which the control air flow passage inlet port is fluidly isolated from the control air flow passage outlet port, and an open position, in which the control air flow passage inlet port is fluidly coupled to the control air flow passage outlet port.

In yet another exemplary embodiment, an air turbine starter includes a turbine housing, a turbine wheel, and a starter air valve assembly. The turbine housing has a fluid inlet port, a fluid outlet port, and a fluid flow passage extending therebetween. The turbine wheel has a turbine shaft rotationally mounted within the turbine housing. The turbine wheel further has at least two turbine blades extending radially into the fluid flow passage. The starter air valve assembly is coupled to the turbine housing and includes a valve body, a valve, a rate control servo mechanism, and a valve actuator. The valve body defines a flow passage having at least an inlet port and an outlet port. The valve is disposed at least partially within the flow passage and is moveable between an open position and a closed position. The rate control servo mechanism has at least a control fluid inlet port, a feedback pressure inlet port, and a control fluid outlet port. The control fluid inlet port is adapted to receive a flow of pressurized control fluid, and the feedback pressure inlet port is in fluid communication with the flow passage outlet port. The rate control servo mechanism is responsive to receipt of the flow of pressurized control fluid to supply a controlled flow of the pressurized fluid via the control fluid outlet port. The valve actuator is coupled to the valve and is in fluid communication with the rate control servo mechanism control fluid outlet port to thereby receive the controlled flow of the pressurized fluid. The valve actuator is configured, upon receipt of the controlled flow of the pressurized fluid, to move the valve between the closed position and the open position at a substantially controlled rate.

In yet a further exemplary embodiment, a method of opening a flow control valve mounted on a valve body that defines a flow passage therethrough, and that is coupled to a fluid-operated actuator coupled to the flow control valve includes supplying pressurized fluid from a pressurized fluid source. A first portion of the pressurized fluid is vented. A second portion of the pressurized fluid is supplied to the fluid-operated actuator to generate an opening force that begins opening the flow control valve, whereby pressurized fluid may flow through the valve body flow passage. In response to fluid flow through the valve body, the pressurized fluid is intermittently supplied to the actuator to thereby intermittently generate the opening force at a controlled rate, whereby the flow control valve further opened at a controlled rate.

Other independent features and advantages of the preferred valve assembly, air turbines starter, and associated method will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention. In this regard, before proceeding with the detailed description, it should be appreciated that the present invention is not limited to use in conjunction with a specific type of valve. Thus, although the present invention is, for convenience of explanation, depicted and described as being implemented in a pneumatically-operated butterfly valve and an air turbine starter, it should be appreciated that it can be implemented in numerous other types of pneumatic valves, and in various other devices and environments in which pneumatic valves are used.

Figure 1:
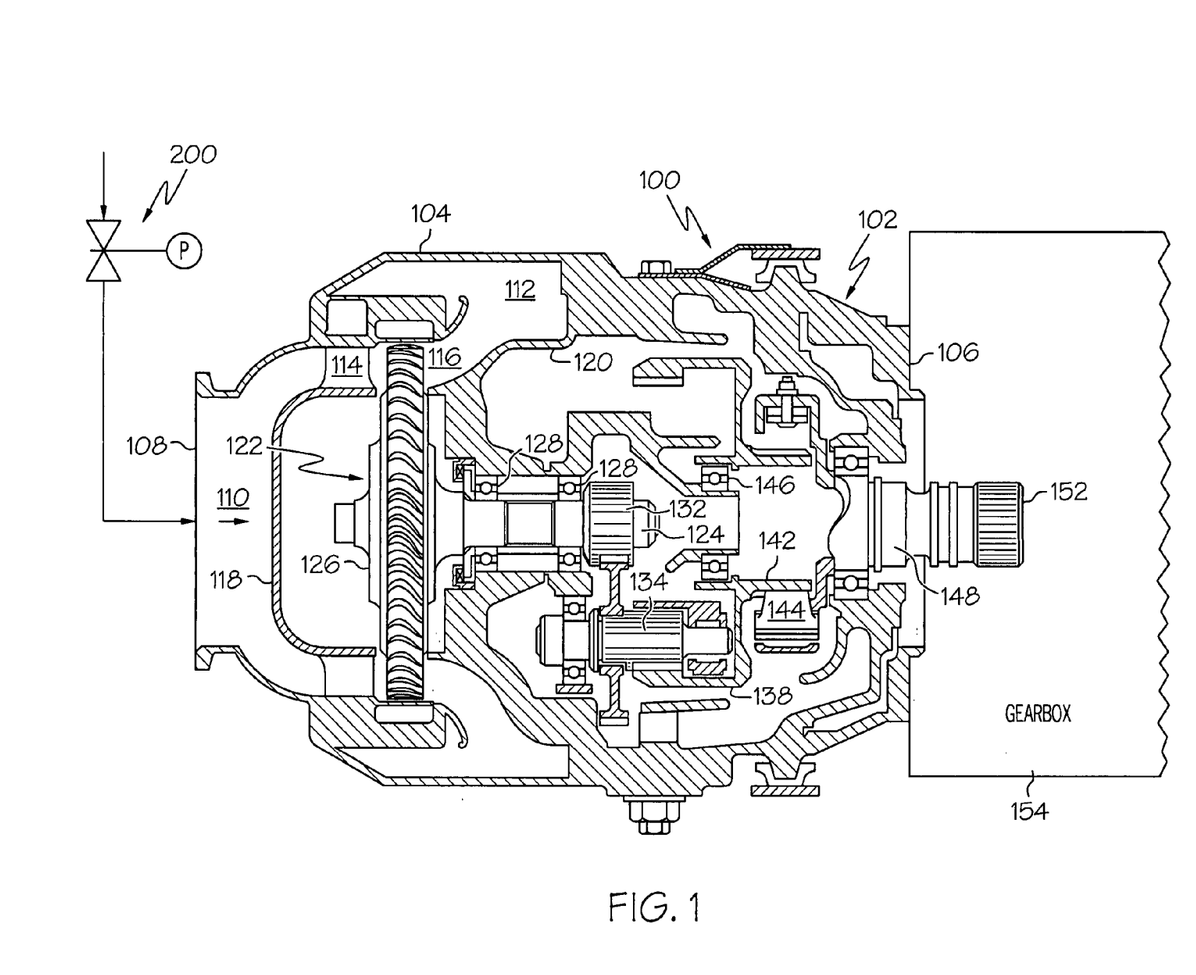
FIG. 1 is a cross section view of an exemplary air turbine starter that may be coupled to a starter air valve according to an exemplary embodiment of the present invention.

Turning now to the description, and with reference first to FIG. 1, a cross section view of an exemplary air turbine starter (ATS) that may be used to initiate the rotation of a larger turbine, such as a turbofan jet engine, is shown. The ATS 100 includes a housing assembly 102 that is used to house various components. The housing assembly 102 may be made up of two or more parts that are combined together or may be integrally formed as a single piece. In the depicted embodiment, the housing assembly is made up of a turbine section 104 and an output section 106.

The housing assembly turbine section 104 includes an inlet plenum 108, which directs pressurized air from a pressurized air source (not illustrated) into the housing assembly turbine section 104, via a starter air valve 200, which, for ease of illustration, is depicted schematically in FIG. 1. It will be appreciated that the pressurized air source may be any one of numerous known sources for supplying pressurized air to an ATS 100. For example, the non-illustrated pressurized air source could be an auxiliary power unit, bleed air from another operating gas turbine engine, or a gas turbine ground power cart. It will additionally be appreciated that a preferred embodiment of the starter air valve 200 will be described in more detail further below.

No matter the specific source of the pressurized air, if the starter air valve 200 is open, pressurized air is directed into the inlet plenum 108, flows through an annular flow channel 110, and exits the ATS 100 via a radial outlet port 112. The annular flow channel 110 includes an axial flow portion 114 or stator and a substantially curved radial flow portion 116. The axial flow portion 114 is formed through a stator assembly 118 that is mounted within the housing assembly turbine section 104 proximate the inlet plenum 108. The curved radial flow portion 116, which flares the annular flow channel 110 radially outwardly, is formed between a portion of the housing assembly turbine section 104 and an exhaust housing 120 that is mounted within the housing assembly 102.

A turbine wheel 122 is rotationally mounted within the housing assembly turbine section 104. In particular, the turbine wheel 122 has an output shaft 124 that extends from a hub 126, through the exhaust housing 120, and into the housing assembly output section 106. The turbine wheel output shaft 124 is rotationally mounted in the housing assembly output section 106 by bearing assemblies 128. A gear 132 is coupled to the turbine wheel output shaft 124, and meshes with a compound planetary gear train 134. The compound planetary gear train 134 engages a ring gear 138 and a hub gear 142, which is in turn coupled to an overrunning clutch 144. During operation of the ATS 100, this gearing configuration converts the high speed, low torque output of the turbine wheel output shaft 124 into low speed, high torque input for the overrunning clutch 144.

The overrunning clutch 144, as noted above, is coupled to the hub gear 142, which is supported by another bearing assembly 146. A drive shaft 148 extends from the overrunning clutch 144, through the housing assembly output section 106, and is coupled to a turbine output shaft 152. The output shaft 152 is in turn coupled to a turbofan jet engine via, for example, a gearbox 154.

Figure 2:
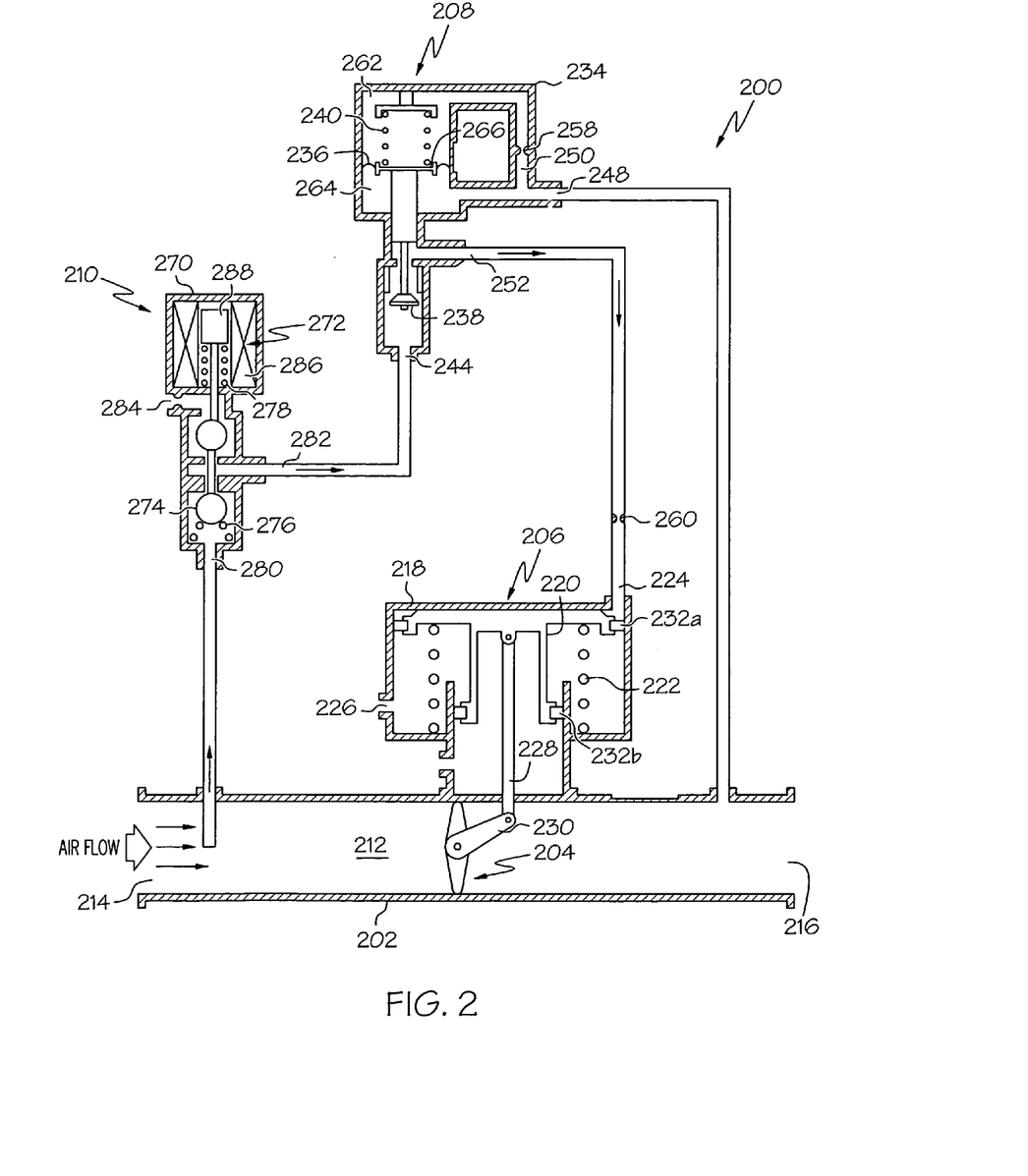
FIG. 2 is a schematic representation of an exemplary embodiment of a pneumatic valve that may be used as the starter air valve shown in FIG. 1.

Turning now to FIG. 2, a detailed schematic representation of an exemplary embodiment of the starter air valve 200 is shown and will be described in detail. The starter air valve 200 includes a valve body 202, a flow control valve 204, an actuator 206, a rate control servo mechanism 208, and an actuation control valve 210. The valve body 202 is adapted to be coupled, and to selectively provide fluid communication, to the non-illustrated pressurized air source and the ATS inlet plenum 108 (not shown in FIG. 2). In particular, the valve body 202 defines a flow passage 212 having a fluid inlet port 214 adapted to couple to the non-illustrated pressurized air source, and a fluid outlet port 216 adapted to couple to the ATS inlet plenum 108.

The flow control valve 204 is disposed within the flow passage 212 and is moveable between a closed position and an open position, to thereby control pressurized air flow through the flow passage 212. In the closed position, which is shown in FIG. 2, the flow control valve 204 prevents pressurized air flow from the fluid inlet port 214, through the flow passage 212, to the fluid outlet port 216. Conversely, when the valve 204 is in the open position, pressurized air may flow through the flow passage 212. The flow control valve 204 may be any one of numerous types of valves useful to selectively isolate an upstream pressurized fluid source from a downstream component. In the preferred embodiment, however, the flow control valve 204 is a butterfly valve.

The actuator 206 is coupled to the flow control valve 204 and is configured to selectively move the flow control valve 204 between the open and closed positions. In the depicted embodiment, the actuator 206 includes an actuator housing 218, a piston 220, and a piston bias spring 222. The actuator housing 218 includes a fluid inlet port 224 and a fluid outlet port 226. The fluid inlet port 224 is in fluid communication with the rate control servo mechanism 208, which is described further below, and the fluid outlet port 226 is vented to ambient surroundings.

The piston 220 is movably mounted within the actuator housing 218 and, in the depicted embodiment, is coupled to the flow control valve 204 via a plurality of connection links 228, 230. Movement of the piston 220 causes translation of one of the connection links 228, which in turn causes rotation of the other connection link 230. The rotating connection link 230 moves the flow control valve 204 between the open and closed positions. A plurality of seals 232a, 232b are coupled to the piston 220 and fluidly isolate the actuator housing fluid inlet 224 and outlet 226 ports from one another. The piston bias spring 222 is also mounted within the actuator housing 218 and is configured to bias the piston 220 in a direction that moves the flow control valve 204 to its closed position. Thus, it will be appreciated that the piston bias spring 222 also biases the flow control valve 204 toward the closed position. Using the frame of reference provided by FIG. 2, the piston bias spring 222 biases the piston 220 upwardly, though it will be appreciated that this is merely illustrative.

The rate control servo mechanism 208 includes a housing 234, a diaphragm 236, a poppet valve 238, and a valve bias spring 240. The housing 234 includes three inlet flow passages, and one outlet flow passage. In particular, the housing 234 includes a control air inlet flow passage 244, a feedback inlet flow passage 248, a rate control inlet flow passage 250, and a control air outlet flow passage 252. The control air inlet flow passage 244 is coupled to receive a flow of pressurized air from the non-illustrated pressurized air source, the feedback inlet flow passage 248 and the rate control inlet flow passage 250 are each in fluid communication with the valve body flow passage 212 downstream of the flow control valve 204, and the control air outlet flow passage 252 is in fluid communication with the actuator housing fluid inlet port 224.

In the depicted embodiment, it is seen that the rate control inlet flow passage 250 and the control air outlet flow passage 252 each include a flow restricting orifice. In particular, the rate control inlet flow passage 250 includes a rate control orifice 258, and the control air outlet flow passage 252 includes a snubbing orifice 260. The function of the snubbing orifice 260 is generally known and will therefore not be further described. The function of the rate control orifice 258 will be described in more detail further below.

As FIG. 2 additionally shows, the rate control servo mechanism housing 234, in combination with the diaphragm 236, defines two chambers—a first chamber 262, and a second chamber 264. The diaphragm 236 is disposed between, and fluidly isolates, the first chamber 262 from the second chamber 264. In a particular preferred embodiment, this is accomplished by coupling the diaphragm 236 to the housing 234 and to a back plate assembly 266. No matter the particular manner in which this is accomplished, the result is that the first chamber 262 is in fluid communication with the rate control inlet flow passage 250, and the second chamber 264 is in fluid communication with the feedback inlet flow passage 248. The purpose and function of these two chambers 262, 264 will become apparent when operation of the starter air valve 200 is described in more detail further below.

The poppet valve 238 is mounted at least partially within the rate control servo mechanism housing 234, and is movable between an open position and a closed position. In the open position, which is shown in FIG. 2, the control air inlet flow passage 244 is fluidly coupled to the control air outlet flow passage 252. Conversely, when the poppet valve 238 is in the closed position, the control air inlet flow passage 244 is fluidly isolated from the control air outlet flow passage 252. Thus, if the control air inlet flow passage 244 is in fluid communication with a pressurized air source, and the poppet valve 238 is open, pressurized air flows through the rate control servo mechanism 208, out the control air outlet flow passage 252, and is communicated to the actuator housing fluid inlet port 224. It will be appreciated that although a poppet valve is used in the rate control servo mechanism 208, this is merely exemplary of a particular preferred embodiment, and numerous other types of valves could also be used.

No matter the specific type of valve that is used, the valve 238 is biased toward its open position by the bias spring 240. In the depicted embodiment, the bias spring 240 is disposed within the housing first chamber 262, between the housing 234 and the back plate assembly 266. The back plate assembly 266, as was noted above, retains a portion of the diaphragm 236. In addition, the back plate assembly 266 is operably coupled to the poppet valve 238. The bias spring 240 is configured such that it exerts a downward bias force (as referenced to FIG. 2) against the back plate assembly 266, which is transmitted to the poppet valve 238, thereby biasing the poppet valve 238 to its open position.

Turning now to a description of the actuation control valve 210, it is seen that this component includes a housing 270, a solenoid 272, a valve 274, a valve bias spring 276, and solenoid bias spring 278. The actuation control valve housing 270 includes an inlet flow passage 280, an outlet flow passage 282, and a vent port 284. The actuation control valve housing inlet flow passage 280 is in fluid communication with the non-illustrated pressurized air source. In the depicted embodiment, the control valve housing inlet flow passage 280 is in fluid communication with the valve body flow passage 212 upstream of the flow control valve 204, which is in turn in fluid communication with the non-illustrated pressurized air source. The actuation control valve housing outlet flow passage 282 is in fluid communication with the rate control servo mechanism housing control air inlet flow passage 244.

The valve 274 is mounted within the actuation control valve housing 270 and is movable between a first position and a second position. In the depicted embodiment, the valve 274 is a double ball type valve, though it will be appreciated that this is merely exemplary of a particular preferred embodiment, and that various other types of valves could be used. No matter the particular type of valve used, in the depicted embodiment it is seen that the valve bias spring 276 biases the valve 274 toward the first position (shown in FIG. 2). When the valve 274 is in the first position, the control valve housing outlet flow passage 282 is fluidly coupled to the vent port 284. When the valve 274 is in the second position, the control valve housing outlet flow passage 282 is fluidly isolated from the vent port 284, and is fluidly coupled to the control valve housing fluid inlet passage 280. As will be described in more detail further below, when the valve 274 is moved from the first to the second position, the end result is that the flow control valve 204 will open. In addition, when the valve 274 is subsequently moved from the second position to the first position, the end result is that the flow control valve 204 will close.

The solenoid 272 is coupled to, or mounted within, the actuation control valve housing 270, and includes one or more coils 286, and a moveable armature 288. As is generally known, when a solenoid coil 286 is energized, it generates a magnetic force that acts on the armature 288, causing it to move. In the depicted embodiment, the solenoid 272 is configured such that when the solenoid coil 286 is energized, the armature 288 moves the valve 274, against the bias force of both the solenoid bias spring 278 and the valve bias spring 276, to the second position.

Having described the starter air valve assembly 200 from a structural standpoint, a description of how the starter air valve assembly 200 functions, will now be provided. In the following discussion, it is presumed that the flow control valve 204 is initially in the closed position.

In order to open the flow control valve 204, to thereby permit fluid flow through the valve body 202, the actuation control valve solenoid 272 is energized. When energized, the solenoid 272 moves the valve 274 from the first to the second position, thereby allowing pressurized air to flow through the actuation control valve 210 and into the rate control servo mechanism control air inlet flow passage 244. Because the poppet valve 238 is biased toward its open position, the pressurized air flows past the poppet valve 238, into and through the control air outlet flow passage 252 and the snubbing orifice 260, and into the actuator housing 218. The pressurized air supplied to the actuator housing 218 causes the actuator piston 220 to begin to move the flow control valve 204 toward the open position. As a result, pressurized air flows into the valve body flow passage 212 downstream of the flow control valve 204, and the downstream pressure begins to increase.

As the pressurized air begins flowing into the flow passage 212 downstream of the flow control valve 204, some of the pressurized air flows into the feedback inlet flow passage 248. A portion of this pressurized air is directed into the second chamber 264, whereby the pressure in the second chamber 264 is essentially equal to the pressure in the flow passage 212 downstream of the flow control valve 204. The remaining portion of the flow into the feedback inlet flow passage 248 is directed into the first chamber 262, via the rate control inlet flow passage 250. The flow of pressurized air into the first chamber 262 is slowed by the rate control orifice 258, such that the pressure in the first chamber 262 rises at a controlled rate, and results in a differential pressure between the first 262 and second 264 chambers.

When the pressure differential between the first 262 and second 264 chambers rises to a predetermined magnitude, the pressure differential acts on the diaphragm 236 and backing plate assembly 266, causing these components to move the poppet valve 238 toward the closed position. Conversely, when the pressure differential between the first 262 and second 264 chambers drops below the predetermined magnitude, the pressure differential acts on the diaphragm 236 and backing plate assembly 266, causing these components to move the poppet valve 238 toward the open position. As the poppet valve 238 opens and closes, it modulates the flow of pressurized air to the actuator housing 218.

The flow of pressurized air to the actuator housing 218 controls the rate of motion of the piston 220, which controls the motion of the links 228, 230, which in turn controls the rate of opening of the flow control valve 204. The rate of opening of the flow control valve 204 controls the rate of pressure increase in the flow passage 212 downstream of the flow control valve 204.

It will be appreciated that the size of the rate control orifice is selected to achieve the desired valve opening characteristics. In particular, the rate control orifice 258 is sized so that the pressure in the second chamber 264 equalizes with flow passage downstream pressure before the pressure in the first chamber 262, to maintain a pressure differential between the first 262 and the second 264 chmabers. As a result, the poppet valve 238 will modulate and the flow control valve 204 will open at a desired rate.

When it is desired to close the starter air valve 200, the actuation control valve solenoid 272 is de-energized. As a result, the solenoid bias spring 278 and the valve bias spring 276, move the valve 274 to the first position. With the valve 274 in the first position, the actuation control valve housing vent port 284 is fluidly coupled to the outlet flow passage 282, which is in turn fluidly coupled to the rate control servo mechanism housing control air inlet flow passage 244. Because the poppet valve 238 is biased toward its open position, the control air outlet flow passage 252 and thus the actuator housing 218 are fluidly coupled to the control air inlet flow passage 244. Thus, the control air in the actuator housing 218 is vented to atmosphere via the actuation control valve housing vent port 284. This releases the pressure on the actuator piston 220 and, assisted by the force of the piston bias spring 222, causes the actuator 206 to move the flow control valve 204 to the closed position.

As was previously noted, some starter air valves may be configured as pressure regulating valves. A particular embodiment of a pressure regulating starter air valve 300, is shown schematically in FIG. 3 and will now be described in more detail. It will be appreciated that like reference numerals in FIG. 3 refers to like parts in FIG. 2. It is seen from FIG. 3 that the starter air valve 300 includes many of the same components as the previously described starter air valve 200 embodiment. Thus, for brevity, the like components of these two embodiments will not be once again described.

Figure 3:
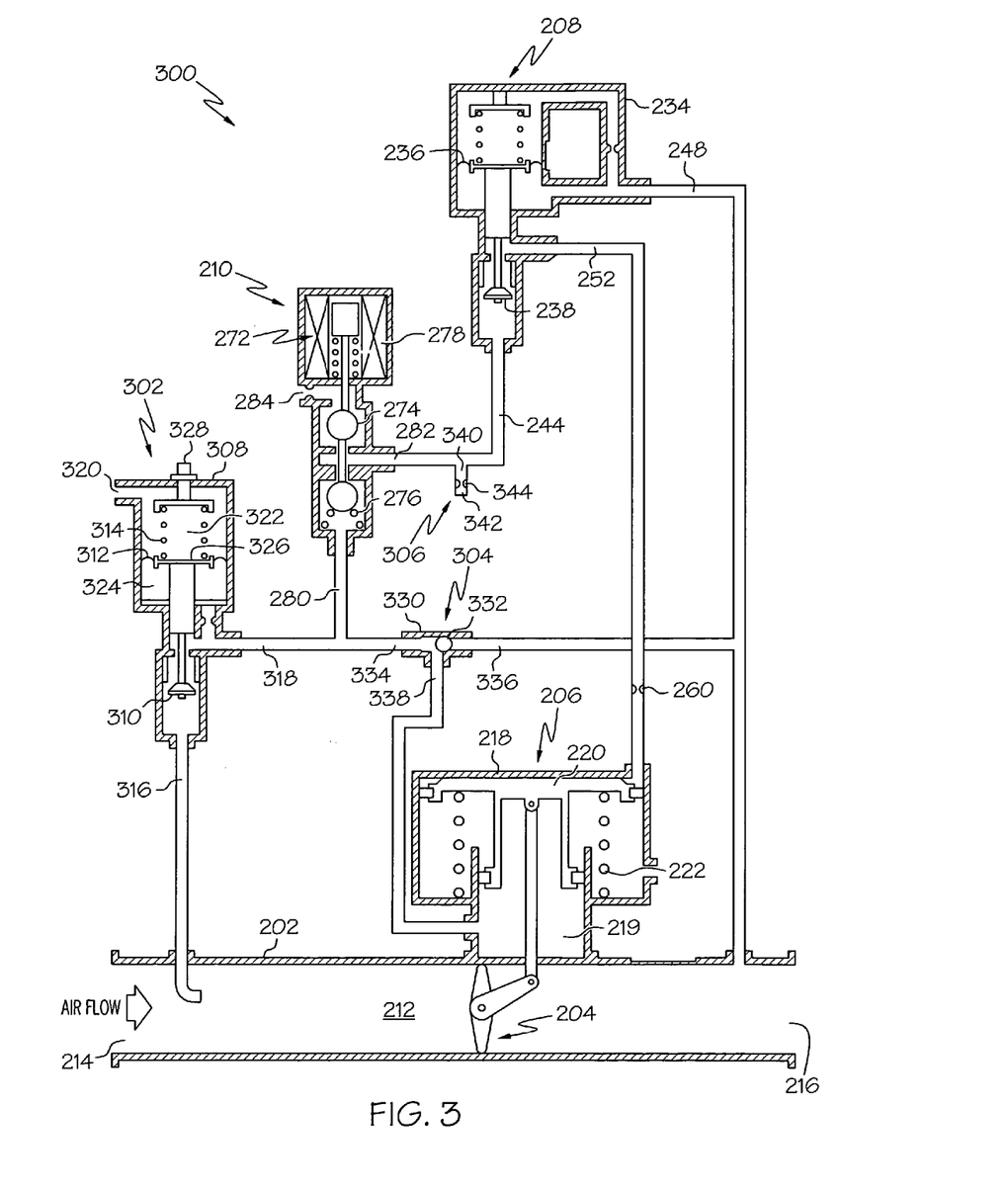
FIG. 3 is a schematic representation of another exemplary embodiment of a pneumatic valve.

In addition to the previously described valve body 202, flow control valve 204, actuator 206, rate control servo mechanism 208, and actuation control valve 210, the starter air valve 300 of FIG. 3 includes a reference pressure regulator 302, a shuttle valve 304, and a bleed flow passage 306. The reference pressure regulator 302 will be described first, and is seen to include a housing 308, a regulator valve 310, a diaphragm 312, and a reference spring 314. The housing 308 includes an inlet flow passage 316, an outlet flow passage 318, and a vent 320. The inlet flow passage 316 is in fluid communication with the non-illustrated pressurized air source. In the depicted embodiment, the inlet flow passage 316 is in fluid communication with the flow passage fluid inlet port 214, which is in turn in fluid communication with the non-illustrated pressurized air source. The outlet flow passage 318 is in fluid communication with the actuation control valve housing inlet flow passage 280, and with the shuttle valve 304.

The diaphragm 312 is disposed within the regulator housing 308 and, in combination therewith, defines a vent chamber 322 and a reference pressure chamber 324 therein. The housing inlet 316 and outlet 318 flow passages are in fluid communication with the reference pressure chamber 324, and the vent 320 is in fluid communication with the vent chamber 322. The diaphragm 312 in the reference pressure regulator 302, similar to the diaphragm 236 in the rate control servo mechanism 208, is coupled to the regulator housing 308 and to a back plate 326. The back plate 326 is in turn coupled to the regulator valve 310.

The regulator valve 310 is mounted within the reference pressure regulator housing 308 and is moveable between a closed position and an open position. In the closed position, the regulator valve 310 isolates the regulator housing outlet flow passage 318 from the inlet flow passage 316. Conversely, when the regulator valve 310 is in the open position, the regulator housing outlet flow passage 318 is fluidly coupled to the inlet flow passage 316, and pressurized air may thus flow through the housing 308.

The reference spring 314 is disposed within the regulator housing vent chamber 322, and is coupled between the regulator housing 308 and the back plate 326. The reference spring 314 is configured to supply a bias force to the regulator valve 310, via the back plate 326. The magnitude and direction of the bias force supplied by the reference spring 314 is such that it urges the regulator valve 310 toward the open position. However, if pressure in the reference chamber 324 is above the predetermined reference magnitude, the reference spring bias force is overcome, and the regulator valve 310 is moved to the closed position. It will be appreciated that the bias force supplied by the reference spring 314 is preferably adjustable, to thereby adjust the pressure magnitude at which the regulator valve 310 will close. In the depicted embodiment, the reference regulator 302 includes an adjustment nut 328 that facilitates adjustment of the bias force.

Turning now to a description of the shuttle valve 304, it is seen that this component includes a housing 330 and a shuttle element 332. The shuttle valve housing 330 includes three fluid ports—a first fluid port 334, a second fluid port 336, and a third fluid port 338. The first fluid port 334 is in fluid communication with the reference regulator outlet flow passage 318, the second fluid port 336 is in fluid communication with the valve body outlet port 216, and the third fluid port 338 is in fluid communication with the valve actuator 206.

The shuttle element 332 is disposed within the shuttle valve housing 330 and is movable between a first position (shown in FIG. 3) and a second position (not shown). In the first position, the shuttle element 332 fluidly couples the first fluid port 334 to the third fluid port 338, and isolates the second fluid port 336 from the first 334 and third fluid ports 338. In the second position, the shuttle element 332 fluidly couples the second fluid port 336 to the third fluid port 338, and fluidly isolates the first fluid port 334 from the second 336 and third 338 fluid ports.

The remaining portion of this starter air valve embodiment 300 that differs from the previous embodiment is the bleed flow passage 306. The bleed flow passage 306 is fluidly coupled between the actuation control valve housing outlet flow passage 282 and the rate control servo mechanism housing control air inlet flow passage 244. In particular, the bleed flow passage includes an inlet port 340 that is fluidly coupled to both the actuation control valve housing outlet flow passage 282 and the rate control servo mechanism housing control air inlet flow passage 244, and an outlet port 342 that is vented to the surrounding environment. A bleed orifice 344 is disposed within the bleed flow passage 306, and restricts the flow of pressurized air through the bleed flow passage 306. The bleed orifice 344 is sized to not only limit pressurized air flow through the bleed flow passage 306, but additionally ensures that the pressure downstream of the regulator housing outlet flow passage 318 does not exceed a predetermined pressure magnitude when the actuation control valve 210 is energized.

As with the previous embodiment, having now described the starter air valve 300 shown in FIG. 3 structurally, a description of the operation of the starter air valve 300 will now be provided. As before, the following description is predicated on the flow control valve 204 initially being in the closed position.

With the flow control valve 204 in the closed position, it is seen that the actuation control valve solenoid 272 is de-energized. With the solenoid 272 de-energized, the valve 274 is in its first position, which means the actuation control valve housing inlet flow passage 280 is fluidly isolated from the actuation control valve housing outlet flow passage 282. As a result, the pressure in the reference pressure chamber 324, and thus the reference regulator housing outlet flow passage 318 and the shuttle valve housing first fluid port 334, approaches the pressure at the flow passage inlet port 214. This pressure is substantially equivalent to that in the non-illustrated pressure source, and is greater than the pressure at the flow passage outlet port 216. Thus, as shown, the shuttle element 332 is in the first position, and the pressure in a feedback chamber 219 located below the actuator piston 220 aids the piston bias spring 222 in urging the flow control valve 204 toward its closed position. It will additionally be appreciated that as the pressure in the reference pressure chamber 324 exceeds the predetermined reference magnitude, the regulator valve 310 will close, although this is not shown in FIG. 3. There will nonetheless be a small amount of leakage around the regulator valve 310.

When it is desired to open the flow control valve 204, to thereby permit fluid flow through the valve body 202, the actuation control valve solenoid 272 is energized. When energized, the solenoid 272 moves the valve 274 from the first position to the second position. If, as was noted above, the regulator valve 310 was closed due to the pressure in the reference chamber 324, this pressure is slowly relieved through the bleed orifice 344, via the actuation control valve 210, thereby allowing the regulator valve 310 to open, and the reference regulator 302 to begin regulating air pressure downstream of the reference regulator housing outlet flow passage 318.

With the regulator valve 310 in the open position, this allows pressurized air, at a regulated pressure magnitude, to flow through the reference regulator 302, into and through the actuation control valve 210, and into the rate control servo mechanism control air inlet flow passage 244. A portion of the regulated pressurized air that flows through the actuation control valve 210 also continues to flow through the bleed orifice 344. As before, because the poppet valve 238 is biased toward its open position, the regulated pressurized air supplied to the rate control servo mechanism control air inlet flow passage 244 flows past the poppet valve 238, into and through the control air outlet flow passage 252 and the snubbing orifice 260, and into the actuator housing 218. Because the area on the top side (relative to the perspective of FIG. 3) of the piston 220 is much greater than the area below the piston 220, the overall force on the actuator piston 220 causes it to begin to move the flow control valve 204 toward the open position. As a result, pressurized air from the non-illustrated pressurized air source flows into the flow passage 212 downstream of the flow control valve 204, and the downstream pressure begins to increase.

As the pressurized air begins flowing into the flow passage 212 downstream of the flow control valve 204, some of the pressurized air flows back to the rate control servo mechanism 208, via the feedback inlet flow passage 248. A portion of this pressurized air is also directed into the shuttle valve 304, via the shuttle valve housing second fluid port 336. The overall operation of the rate control servo mechanism 208 in this embodiment 300 is the same as in the previous embodiment 200, thus its operation hereafter will not be reiterated. When the pressure magnitude of the pressurized air downstream of the flow control valve 204 exceeds the pressure magnitude of the regulated pressurized air flowing into the shuttle valve housing first fluid port 334, the shuttle element 332 is moved from the first position to the second position. Thus, the shuttle valve housing third fluid port 338 is fluidly coupled to the second fluid port 336, which means the downstream air pressure is now in fluid communication with the actuator housing feedback chamber 219, and is acting on the bottom side of the actuator piston 220. This pressure, in combination with the piston bias spring 222, supplies a closing force that urges the actuator piston 220 to move the flow control valve 204 toward the closed position. The closing force is counteracted by the opening force generated by the pressure of the regulated pressurized air supplied to the top side of the actuator piston 220 via the rate control servo mechanism 208 and reference regulator 302.

As long as the actuation control valve 210 remains energized, the combination of the closing and opening forces will continue acting on the actuator piston 220. Together, these forces act to position the flow control valve 204 so that the pressure downstream of the flow control valve 204 is regulated to a predetermined magnitude. For example, if downstream pressure increases above the predetermined magnitude, the flow control valve 204 is moved toward its closed position, reducing flow through the flow passage 212 and causing downstream pressure to begin decreasing. As the downstream pressure begins decreasing, the closing force generated thereby concomitantly decreases, causing the flow control valve 204 to move open further and downstream pressure to increase.

When it is desired to close the starter air valve 300, its operation is similar to that of the previously described embodiment 200. In particular, the actuation control valve solenoid 272 is first de-energized, which allows the solenoid bias spring 278 and the valve bias spring 276 to move the valve 274 to the first position. With the valve 274 in the first position, the bleed flow passage 340 is fluidly isolated from the reference regulator 302. However, the bleed flow passage 340 and actuation control valve vent port 284 remain fluidly coupled to the rate control servo mechanism housing control air inlet flow passage 244. Because the poppet valve 238 is biased toward its open position, the control air outlet flow passage 252 and thus the actuator housing 218 are fluidly coupled to the bleed flow passage 340 and vent port 284. Thus, the regulated control air in the actuator housing 218 is vented to atmosphere via the bleed flow passage 340 and vent port 284. This releases the pressure on the top side of the actuator piston 220 and, assisted by the force of the downstream pressure in the actuator housing feedback chamber 219 on the bottom side of the actuator piston 220 and the piston bias spring 222, causes the actuator 206 to move the flow control valve 204 to the closed position. When the flow control valve 204 closes, the downstream pressure magnitude decreases. When the regulated pressure at the shuttle valve housing first fluid port 334 exceeds the downstream pressure, the shuttle element 332 returns to the first position, and the starter air valve 300 returns to the configuration shown in FIG. 3. The non-illustrated pressure source is now in fluid communication with the actuator housing feedback chamber 219.

The rate control servo mechanisms 208 in the starter air valves 200, 300 shown in FIGS. 2 and 3 and described above each include a relatively small clearance between the poppet valve 238 and the rate control servo mechanism housing 234. This clearance, which is not visible in the drawings, allows a limited amount of leakage across the poppet valve 238, and between the feedback inlet flow passage 248 and the control air outlet flow passage 252. In some instances, the pressure regulating starter air valve 300 is sensitive to this leakage, resulting in a regulation overshoot when the flow control valve 204 is initially opened. In addition, this leakage can, in both starter air valve 200, 300 embodiments, result in an increased pressure head on the actuator piston 220 when the flow control valve 204 is initially opened. This increased pressure head can result in an initial, undesirable "opening spike" of the flow control valve 204.

Figure 4:
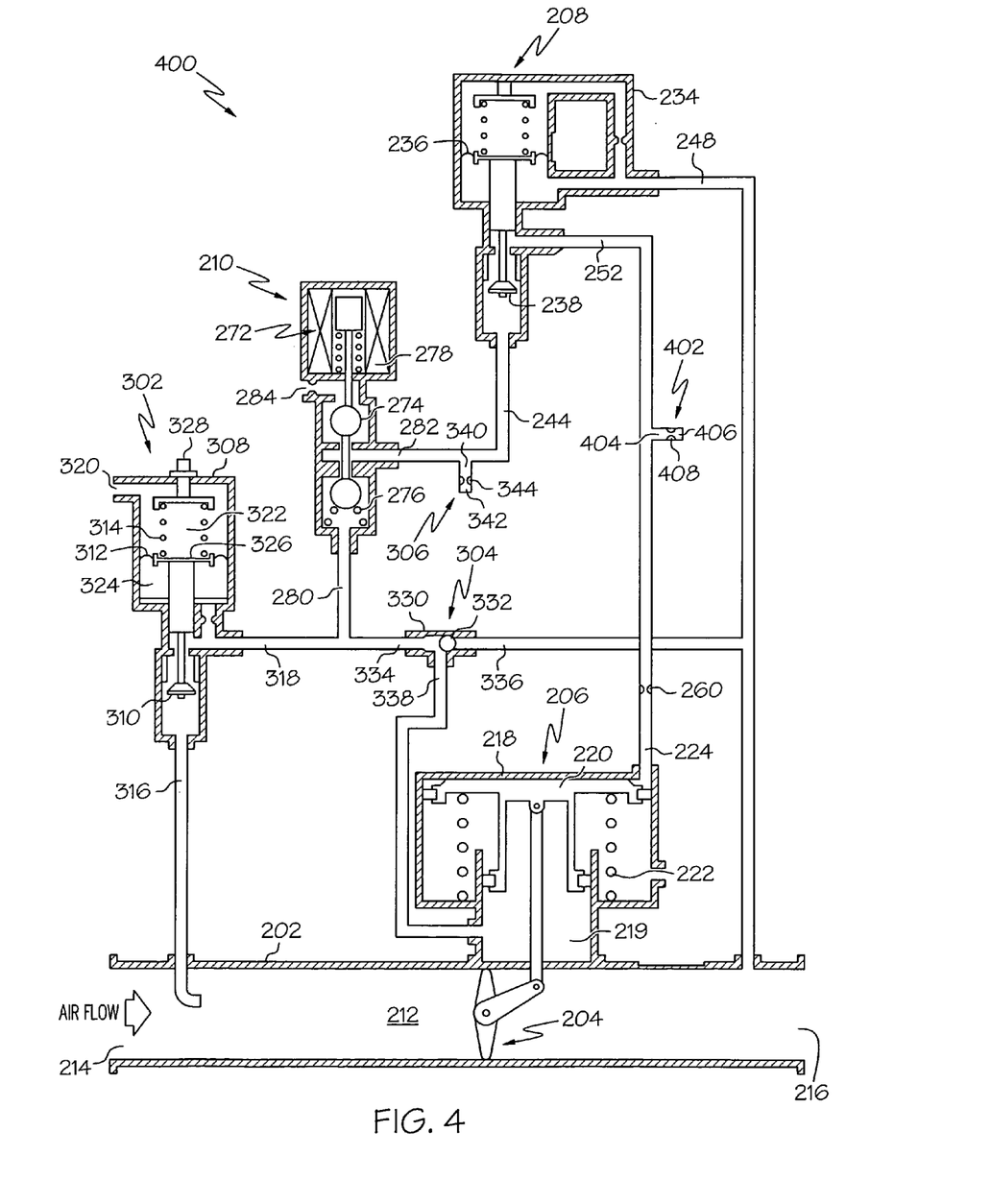
FIG. 4 is a schematic representation of yet another exemplary embodiment.

Turning now to FIG. 4, an alternative embodiment of a pressure regulating starter air valve 400 is shown. The configuration of this alternative starter air valve 400 alleviates the above-noted potential drawbacks of the starter air valve 300. As may be seen, this alternative starter air valve 400, with the exception of one additional component, includes the same components as the starter air valve 300 just described. Thus, for brevity, the like components of these two embodiments, which are numbered with like reference numerals, will not be described again. The additional component included in the alternative starter air valve 400 is a rate control servo vent 402, and will now be described in more detail. Before doing so, however, it will be appreciated that the rate control servo vent 402 can be included in either of the previously described starter air valve embodiments. Thus, while a pressure regulating starter air valve embodiment is shown and described, it will be appreciated that the rate control servo vent 402 could also be included in the non-regulating embodiment shown in FIG. 2.

The rate control servo vent 402 is fluidly coupled between the rate control servo mechanism control air outlet flow passage 252 and the actuator housing fluid inlet port 224. In particular, the rate control servo vent includes an inlet port 404 that is fluidly coupled to both the rate control servo mechanism control air outlet flow passage 252 and the actuator housing fluid inlet port 224, and an outlet port 406 that is vented to the surrounding environment. A vent orifice 408 is disposed within the rate control servo vent 402, and restricts the flow of pressurized air through the rate control servo vent 402.

The vent orifice 408 is sized to allow a controlled amount of leakage to occur between the rate control servo mechanism control air outlet flow passage 252 and the actuator housing fluid inlet port 224. This controlled leakage limits the rate at which pressure in the actuator housing 218 increases during the initial opening sequence of the flow control valve 204. This in turn substantially eliminates the above-described regulation overshoot, and the "opening spike" of the flow control valve 204.

The starter air valves 300, 400 described above and depicted in FIGS. 3 and 4 are merely exemplary of particular embodiments of regulating valve configurations. Various other configurations could also be used to implement the regulating valve embodiment. For example, the starter air valves 300, 400 could be implemented by transposing the positions of the reference regulator 302 and the actuation control valve 210, and not including the shuttle valve 304 and the flow passages associated therewith.

The starter air valves 200, 300, 400 are, for ease of explanation, depicted herein schematically. It will be appreciated that the components that make up the starter air valves 200, 300, 400, while illustrated as individual components fluidly coupled by individual flow passages, are preferably physically configured together as a single valve assembly. However, it will be additionally appreciated that the starter air valves 200, 300, 400 could, if desired, be constructed and physically implemented as individual, spaced-apart components, as illustrated in the schematic representations.

The starter air valves 200, 300, 400 depicted and described herein are configured to provide improved opening characteristics relative to presently known valves. The configuration of the disclosed valves 200, 300, 400 additionally compensates for piston seal or diaphragm leakage that may occur in the actuator 206. Moreover, the valves 200, 300, 400 will continue to operate even if relatively large amounts of piston seal or diaphragm leakage occurs.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A starter air valve assembly, comprising:

a valve body defining a flow passage having at least an inlet port and an outlet port;

a valve disposed at least partially within the flow passage and moveable between an open position and a closed position;

a rate control servo mechanism having at least a control fluid inlet port, a feedback pressure inlet port, and a control fluid outlet port, the control fluid inlet port adapted to receive a flow of pressurized control fluid, the feedback pressure inlet port in fluid communication with the flow passage outlet port, the rate control servo mechanism responsive to receipt of the flow of pressurized control fluid to supply a controlled flow of the pressurized fluid via the control fluid outlet port;

a valve actuator coupled to the valve and in fluid communication with the rate control servo mechanism control fluid outlet port to thereby receive the controlled flow of the pressurized fluid, the valve actuator configured, upon receipt of the controlled flow of the pressurized fluid, to move the valve between the closed position and the open position at a substantially controlled rate;

an actuation control valve housing having a fluid inlet adapted to receive pressurized fluid and a fluid outlet in fluid communication with the rate control servo mechanism control fluid inlet port;

an actuation control valve mounted within the actuation control valve housing and moveable between a first position, in which the actuation control valve housing fluid inlet is fluidly isolated from the actuation control valve housing fluid outlet, and a second position, in which the actuation control valve housing fluid inlet is fluidly coupled to the actuation control valve housing fluid outlet, to thereby supply pressurized fluid to the rate control servo mechanism;

a shuttle valve housing having a first fluid port in fluid communication with the actuation control valve housing fluid inlet, a second fluid port in fluid communication with the flow passage outlet port, and a third fluid port in fluid communication with the valve actuator; and a shuttle element disposed within the shuttle valve housing and movable between at least a first position, in which the shuttle element fluidly isolates the first fluid port from the third fluid port, and a second position, in which the shuttle element fluidly isolates the second fluid port from the third fluid port.

2. The valve assembly of claim 1, further comprising:

a solenoid coupled to the actuation control valve, the solenoid adapted to receive an electrical signal and operable, in response thereto, to move between a first position and a second position, to thereby move the actuation control valve between the first and second positions, respectively.

3. The valve assembly of claim 1, further comprising:

a reference regulator having a fluid inlet and a fluid outlet, the fluid inlet adapted to couple to a pressurized fluid source, the fluid outlet fluidly coupled to the actuation control valve housing fluid inlet, the reference regulator configured to selectively supply pressurized fluid to the actuation control valve housing fluid inlet at a substantially constant, regulated pressure.

4. The valve assembly of claim 3, further comprising:
a bleed flow passage having an inlet port and an outlet port, the bleed flow passage inlet port fluidly coupled to the actuation control valve housing fluid outlet port; and
a bleed orifice disposed within the bleed flow passage.

5. The valve assembly of claim 4, wherein the bleed orifice is sized so that the substantially constant, regulated pressure does not exceed a predetermined pressure magnitude.

6. The valve assembly of claim 3, further comprising:
a vent passage having an inlet port and an outlet port, the vent passage inlet port fluidly coupled to the rate control servo mechanism control fluid outlet port; and
a vent orifice disposed within the vent passage.

7. The valve assembly of claim 1, wherein the rate control servo mechanism comprises:
a housing defining at least a first chamber and a second chamber;
a diaphragm disposed between the first and second chambers and fluidly isolating the first and second chambers from one another;
a control air flow passage extending through the housing and having at least an inlet port and an outlet port, the control air flow passage inlet port adapted to receive a flow of pressurized fluid, and the control air flow passage outlet port adapted to fluidly couple to a valve actuator;
a feedback flow passage coupled to the housing and having at least an inlet port and an outlet port, the feedback flow passage inlet port adapted to fluidly couple to a flow duct, and the feedback flow passage outlet port in fluid communication with the second chamber;
a rate control flow passage coupled to the housing and having at least an inlet port and an outlet port, the rate control flow passage inlet port fluidly coupled to the feedback flow passage outlet port, and the rate control flow passage outlet port in fluid communication with the first chamber;
a vent passage having an inlet port and an outlet port, the vent passage inlet port fluidly coupled to the control air flow passage outlet port, the vent passage outlet port vented to atmosphere; and
a rate control valve disposed within the housing and coupled to the diaphragm, the rate control valve movable between a closed position, in which the control air flow passage inlet port is fluidly isolated from the control air flow passage outlet port, and an open position, in which the control air flow passage inlet port is fluidly coupled to the control air flow passage outlet port.

8. The valve assembly of claim 7, further comprising:
a rate control orifice disposed within the rate control flow passage; and
a vent orifice disposed within the vent passage.

9. The valve assembly of claim 8, wherein at least the rate control orifice is sized to control a differential pressure between the first and second chambers, to thereby control movement of the rate control valve between the open position and the closed position, whereby the flow of pressurized fluid to the valve actuator is controlled.

10. The valve assembly of claim 1, further comprising:
a vent passage having an inlet port and an outlet port, the vent passage inlet port fluidly coupled to the rate control servo mechanism control fluid outlet port; and
a vent orifice disposed within the vent passage.

11. A rate control servo mechanism for controlling a rate of movement of a valve, the mechanism comprising:
a housing defining at least a first chamber and a second chamber;
a diaphragm disposed between the first and second chambers and fluidly isolating the first and second chambers from one another;
a control air flow passage extending through the housing and having at least an inlet port and an outlet port, the control air flow passage inlet port adapted to receive a flow of pressurized fluid, and the control air flow passage outlet port adapted to fluidly couple to a valve actuator;
a feedback flow passage coupled to the housing and having at least an inlet port and an outlet port, the feedback flow passage inlet port adapted to fluidly couple to a flow duct, and the feedback flow passage outlet port in fluid communication with the second chamber;
a rate control flow passage coupled to the housing and having at least an inlet port and an outlet port, the rate control flow passage inlet port fluidly coupled to the feedback flow passage outlet port, and the rate control flow passage outlet port in fluid communication with the first chamber;
a vent passage having an inlet port and an outlet port, the vent passage inlet port fluidly coupled to the control air flow passage outlet port, the vent passage outlet port vented to atmosphere; and
a rate control valve disposed within the housing and coupled to the diaphragm, the rate control valve movable between a closed position, in which the control air flow passage inlet port is fluidly isolated from the control air flow passage outlet port, and an open position, in which the control air flow passage inlet port is fluidly coupled to the control air flow passage outlet port.

12. The mechanism of claim 11, further comprising:
a rate control orifice disposed within the rate control flow passage; and
a vent orifice disposed within the vent passage.

13. The mechanism of claim 11, wherein the rate control valve comprises a poppet valve.

14. The mechanism of claim 11, further comprising:
a back plate coupled to the rate control valve and the diaphragm; and
a spring disposed within the first chamber and coupled between the housing and back plate, the spring configured to bias the rate control valve toward the open position.

15. An air turbine starter, comprising:
a turbine housing having a fluid inlet port, a fluid outlet port, and a fluid flow passage extending therebetween;
a turbine wheel having a turbine shaft rotationally mounted within the turbine housing, the turbine wheel further having at least two turbine blades extending radially into the fluid flaw passage; and
a starter air valve assembly coupled to the turbine housing, the starter air valve assembly including:
a valve body defining a flow passage having at least an inlet port and an outlet port, the flow passage inlet port adapted to receive a flow of pressurized air, the flow passage outlet port in fluid communication with the turbine housing fluid inlet port,
a flow control valve disposed at least partially within the flow passage and moveable between an open position and a closed position;

a rate control servo mechanism having at least a control fluid inlet port, a feedback pressure inlet port, and a control fluid outlet port, the control fluid inlet port adapted to receive a flow of pressurized control fluid, the feedback pressure inlet port in fluid communication with the flow passage outlet port, the rate control servo mechanism responsive to receipt of the flow of pressurized control fluid to supply a controlled flow of the pressurized fluid via the control fluid outlet port;

a valve actuator coupled to the valve and in fluid communication with the rate control servo to thereby receive the controlled flow of the pressurized fluid, the valve actuator configured, upon receipt of the controlled flow of the pressurized fluid, to move the flow control valve between the closed position and the open position at a substantially controlled rate, whereby the turbine housing fluid inlet port is fluidly isolated from and fluidly coupled to, respectively, the flow passage inlet port;

an actuation control valve housing having a fluid inlet adapted to receive pressurized fluid and a fluid outlet in fluid communication with the rate control servo mechanism control fluid inlet port;

an actuation control valve mounted within the actuation control valve housing and moveable between a first position, in which the actuation control valve housing fluid inlet is fluidly isolated from the actuation control valve housing fluid outlet, and a second position, in which the actuation control valve housing fluid inlet is fluidly coupled to the actuation control valve housing fluid outlet, to thereby supply pressurized fluid to the rate control servo mechanism;

a shuttle valve housing having a first fluid port in fluid communication with the actuation control valve housing fluid inlet, a second fluid port in fluid communication with the flow passage outlet port, and a third fluid port in fluid communication with the valve actuator; and a shuttle element disposed within the shuttle valve housing and movable between at least a first position, in which the shuttle element fluidly isolates the first fluid port from the third fluid port, and a second position, in which the shuttle element fluidly isolates the second fluid port from the third fluid port.

16. A starter air valve assembly, comprising:

a valve body defining a flow passage having at least an inlet port and an outlet port;

a valve disposed at least partially within the flow passage and moveable between an open position and a closed position;

a rate control servo mechanism having at least a control fluid inlet port, a feedback pressure inlet port, and a control fluid outlet port, the control fluid inlet port adapted to receive a flow of pressurized control fluid, the feedback pressure inlet port in fluid communication with the flow passage outlet port, the rate control servo mechanism responsive to receipt of the flow of pressurized control fluid to supply a controlled flow of the pressurized fluid via the control fluid outlet port; and a valve actuator coupled to the valve and in fluid communication with the rate control servo mechanism control fluid outlet port to thereby receive the controlled flow of the pressurized fluid, the valve actuator configured, upon receipt of the controlled flow of the pressurized fluid, to move the valve between the closed position and the open position at a substantially controlled rate, wherein the rate control servo mechanism comprises:

a housing defining at least a first chamber and a second chamber;

a diaphragm disposed between the first and second chambers and fluidly isolating the first and second chambers from one another;

a control air flow passage extending through the housing and having at least an inlet port and an outlet port, the control air flow passage inlet port adapted to receive a flow of pressurized fluid, and the control air flow passage outlet port adapted to fluidly couple to a valve actuator;

a feedback flow passage coupled to the housing and having at least an inlet port and an outlet port, the feedback flow passage inlet port adapted to fluidly couple to a flow duct, and the feedback flow passage outlet port in fluid communication with the second chamber;

a rate control flow passage coupled to the housing and having at least an inlet port and an outlet port, the rate control flow passage inlet port fluidly coupled to the feedback flow passage outlet port, and the rate control flow passage outlet port in fluid communication with the first chamber;

a vent passage having an inlet port and an outlet port, the vent passage inlet port fluidly coupled to the control air flow passage outlet port, the vent passage outlet port vented to atmosphere; and a rate control valve disposed within the housing and coupled to the diaphragm, the rate control valve movable between a closed position, in which the control air flow passage inlet port is fluidly isolated from the control air flow passage outlet port, and an open position, in which the control air flow passage inlet port is fluidly coupled to the control air flow passage outlet port.

* * * * *

UNITED STATES PATENT AND TRADEMARK OFFICE
CERTIFICATE OF CORRECTION

PATENT NO.       : 7,147,430 B2
APPLICATION NO. : 10/866587
DATED            : December 12, 2006
INVENTOR(S)      : Wiggins et al.

It is certified that error appears in the above-identified patent and that said Letters Patent is hereby corrected as shown below:

Title Page of the Patent Item [75] Inventor's address:
"Quenn" should be changed to --Queen--;
Column 16, line 57, "flaw" should be changed to --flow--.

Signed and Sealed this

Fifteenth Day of May, 2007

JON W. DUDAS
*Director of the United States Patent and Trademark Office*